United States Patent
Kaminski

[11] 3,899,716
[45] Aug. 12, 1975

[54] CONDITION SENSING AND CONTROL APPARATUS

[76] Inventor: David C. Kaminski, 5715 Centerview Dr., Sylvania, Ohio 43560

[22] Filed: Sept. 27, 1973

[21] Appl. No.: 401,371

[52] U.S. Cl. ............................................. 317/5
[51] Int. Cl. ....................................... G01p 3/58
[58] Field of Search .......... 317/5; 290/40; 318/463, 318/464, 465, 326, 327, 318, 341, 601, 602, 608; 322/31

[56] References Cited
UNITED STATES PATENTS

| | | | |
|---|---|---|---|
| 3,340,951 | 9/1967 | Vitt | 317/5 |
| 3,346,771 | 10/1967 | Sutton | 317/5 |
| 3,753,067 | 8/1973 | Milligan | 318/341 |

*Primary Examiner*—L. T. Hix
*Attorney, Agent, or Firm*—Myron E. Click; Robert E. Pollock

[57] ABSTRACT

Control apparatus is disclosed herein which includes means for sensing the condition of a variable and providing an actual condition signal in which the signal has a time duration related in magnitude to the actual condition of the variable. Means responsive to the sensing means generates a reference signal which is initiated at the same time as the actual condition signal, the reference signal having a time duration related in magnitude to a desired condition for the variable. A first logic circuit includes means for providing a complementary signal of the reference signal and further provides a first output signal in response to a coincidence of the actual condition signal and the reference complementary signal to indicate a deviation of the variable in a first direction from the desired condition for the variable. A second logic circuit means includes means for providing a complementary signal of the actual condition signal and further provides a second output signal in response to a coincidence of the reference signal and the complementary actual condition signal to indicate a deviation of the variable in a second direction from the desired condition for the variable.

23 Claims, 7 Drawing Figures

FIG. 3

| Terminal No. | Description |
|---|---|
| 13 | PICKUP OUTPUT |
| 14 | INVERT OF 13 |
| 15 | 14 DIVIDED BY TWO |
| 16 | INVERT OF 15 |
| 17 | 15 DIVIDED BY TWO AND INVERTED |
| 18 | OUTPUT UNLESS BOTH 16 & 17 ARE HIGH |
| 19 | TIMED INTERVAL REFERENCE |
| 20 | INVERTED TIMED INTERVAL REFERENCE |
| 21 | INVERT OF 18 (ACTUAL SPEED SIGNAL) |
| 22 | INVERT OF 21 |
| 23 | OUTPUT UNLESS BOTH 19 & 22 ARE HIGH |
| 24 | OUTPUT UNLESS BOTH 20 & 21 ARE HIGH |

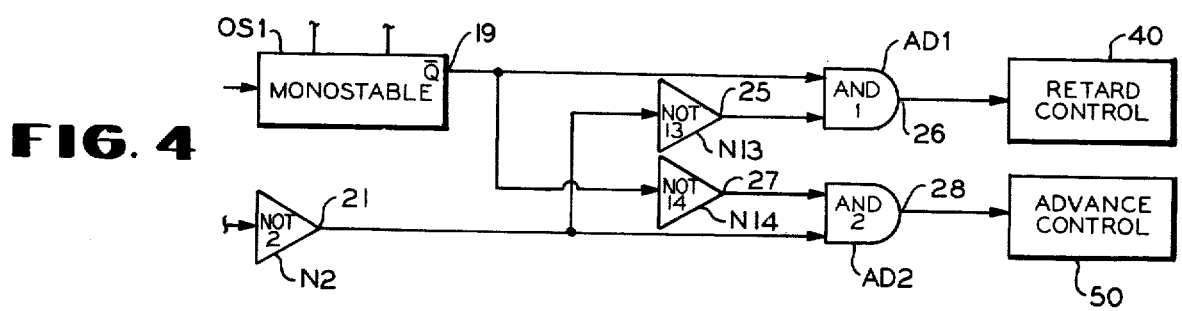
FIG. 4
FIG. 5a — ACTUAL SPEED SIGNAL LONGER THAN REFERENCE SIGNAL
FIG. 5b — ACTUAL SPEED SIGNAL SHORTER THAN REFERENCE SIGNAL
-19- TIMED REFERENCE SIGNAL
-21- ACTUAL SPEED SIGNAL
-25- COMPLEMENT ACTUAL SPEED SIGNAL
-26- RETARD OUTPUT SIGNAL
-27- COMPLEMENT REFERENCE SIGNAL
-28- ADVANCE OUTPUT SIGNAL
FIG. 5
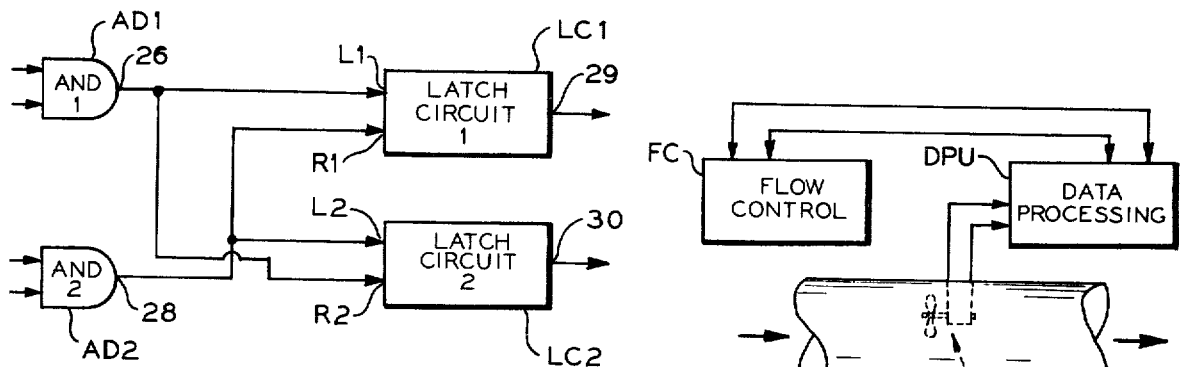
FIG. 6
FIG. 7

CONDITION SENSING AND CONTROL APPARATUS

BACKGROUND OF THE INVENTION

This invention generally relates to a method and apparatus of feedback control wherein the variable parameter of an apparatus or process in a first mode of operation is maintained at or near a predetermined or preset value, this predetermined or preset value being generally called the "setpoint," or, in a second mode of operation, the controlled variable is prevented from exceeding the setpoint value. This is accomplished by measuring the value of the controlled variable, comparing this value with the setpoint value, and then generating a signal proportional to the difference between the two values. The difference signal is used to modify some phase of operation of the apparatus or process so that the value of the controlled variable will either be returned very closely to the setpoint value, or will not be permitted to exceed the setpoint value.

The invention is described herein in an embodiment which relates to improvements in engine speed control systems and, more particularly, to an improved apparatus for regulating the speed of the vehicle's engine while driving auxiliary equipment through a power take-off from the engine, and/or controlling the road speed of the vehicle by regulating the speed of the engine. However, the invention is also useful in passenger vehicles when a desired cruising speed is to be maintained, as in turnpike driving situations.

Today, various forms of trucks include power take-off units for driving auxiliary equipment such as winches, hoists, drums, pumps, compressors, digging equipment, and garbage packing units from the engine of the truck. In such trucks, the power take-off unit is commonly connected to the transmission and is energized by placing the transmission in neutral gear and by shifting a power take-off lever to engage the power take-off unit. Thereafter the rotational output of the engine is transferred through the power take-off unit to the auxiliary or accessory equipment.

After the power take-off unit is engaged, and after the auxiliary equipment is connected therethrough to the engine, the load applied to the engine may vary over a wide range under varying operating conditions. Often it is desired to maintain a uniform operating speed for the engine under such varying load conditions. In the past, this has required a workman in the cab of the truck to visually monitor the operating speed of the engine as displayed on a tachometer and to maintain continuous control of the speed of the engine, as by continuous manual control of the accelerator pedal connected to the throttle for the engine.

In practice, it is quite tiring for the workman to maintain such constant visual and manual control over engine speed, particularly when the load on the engine is of a fluctuating nature. Moreover, such visual and manual control by the workman does not usually result in desired constancy of engine speed. In addition, the requirement that a workman remain in the cab to provide continuous engine speed control necessitates the use of an extra man on the truck for this specific purpose, other men usually being required to monitor the operation of the auxiliary or accessory equipment and to perform functions in conjunction therewith.

In many instances, the auxiliary equipment connected to the engine through the power take-off unit is susceptible to damage if driven at excessive speed. The visual and manual control by the workman, particularly under fluctuating load conditions, sometimes allows the engine to reach such excessive speeds that the auxiliary equipment is seriously damaged.

A variety of different systems have been proposed to either limit the maximum speed at which an engine can operate or maintain an engine at a desired setpoint speed. Many of these prior art devices, while operating satisfactorily for a specific purpose, do not have a sufficiently rapid response time to properly control the speed of a high-performance engine. In addition, some systems often suffer from a large hysteresis, i.e., the speed of the engine will alternately fluctuate above and below the desired predetermined speed. This causes a very undesirable engine operating condition, particularly when the engine is used to power an automotive vehicle.

An improvement upon the above discussed systems is disclosed in U.S. Pat. No. 3,346,771, issued to R. S. Sutton on Oct. 10, 1967, which discloses a circuit which senses the actual speed of a rotating mechanism and provides a pulse having a time duration which is proportional to the actual speed of the device. The actual speed pulse also triggers a one-shot multivibrator to generate a reference pulse of the desired time duration which is proportional to the desired speed of the device. An inverter is utilized to change the positive actual speed pulse to a negative value actual speed pulse. The reference pulse and the actual speed pulse are algebraically combined to ideally provide a positive, negative, or zero output depending upon the relationship of the actual speed to the desired speed. However, if the components age, or if the components are temperature sensitive, or if the circuit drifts, then the magnitudes of the positive and negative pulses beieng algebraically combined may vary so that the algebraic combination of the two pulses may provide a positive or negative output when, in fact, there is supposed to be a zero output.

While the control system of the above-referenced patent is characterized as a digital electronic governor, it utilizes voltages having a positive level, a zero level, and a negative level. A digital system properly comprises only two voltage levels, a positive reading which is or may be read as a binary one and a zero reading which may be read as a binary zero.

Accordingly, it is an object of this invention to provide a new and improved method and apparatus for sensing and controlling the condition of a variable.

It is a further object of this invention to provide a new and improved method and apparatus in which the condition of a variable may be accurately maintained within extremely narrow limits regardless of minor control variations, changes in ambient operating conditions, deterioration of control components, or the like.

A further object of the invention is the provision of a control system having rapid response capabilities for an internal combustion engine that is operative to control the speed of the engine within very close limits without hunting between widely different engine speeds.

It is a further object of this invention to provide a special purpose digital computing system which functions in a unique manner to provide the controls desired herein.

It is a further object of this invention to provide a digital speed control system utilizing only two signal levels, representing "zero" and "one," wherein variations of the magnitude of the "one" signal will not interfere with the proper operation of the system.

A still further object of this invention is to provide a closed loop, speed-sensitive control system which may bring an engine to any predetermined speed within the speed range of the engine and maintain the engine at that speed, and which further allows accurate control of a vehicle's road speed by preventing the driver from exceeding a preset maximum number of miles per hour.

SUMMARY OF THE INVENTION

The above objects of this invention are featured in a speed control apparatus which utilizes first pickup means for sensing the road speed of a vehicle and second pickup means for sensing the speed of an accessory device driven by the engine of the vehicle. Circuit means, responsive to the first and second sensing means, are provided for generating a series of actual speed signals, each signal having a time duration related in magnitude to the actual road speed or accessory speed.

Means are also provided for generating a first series of reference signals in which each first series reference signal has a time duration related in magnitude to a desired maximum road speed and is initiated simultaneously with the initiation of an associated actual speed signal sensed for the vehicle speed. Means are also provided for generating a second series of reference signals, each second series reference signal having a time duration related in magnitude to a desired setpoint for an auxiliary or accessory device speed. Each second series signal is initiated simultaneously with the initiation of an associated actual speed signal sensed for the accessory.

A first logic circuit means is responsive to the presence of an actual speed signal having a longer time duration than a concurrently occurring reference speed signal and provides a first output signal. A second logic circuit means is responsive to the presence of an actual speed signal having a shorter time duration than a concurrently occurring reference signal to provide a second output signal.

A switching means selectively connects the first sensing means to the actual speed signal circuit means and inhibits the second output signal from the second logic circuit means, or alternatively selectively connects a second sensing means to the actual speed circuit means.

The first and second reference signal generating means advantageously includes a one-shot multivibrator which is responsive to the actual speed signal generating means. A first adjustable impedance means controls the time duration of the first reference signals and a second adjustable impedance means controls the time duration of the second reference signals. The switching means referred to hereinbefore advantageously further includes means for selectively connecting the first and second impedance means to the multivibrator in response to the connection of the first and second sensing means to the actual speed circuit means, respectively.

The first logic circuit means may include means responsive to one of the series of actual speed and reference signals for providing a first series of signals complementary to the said one series, and means responsive to the other of the said series of actual speed and reference signals and to the first series of complementary signals for providing a first output signal when the said other and the first complementary signals coincide.

The second logic circuit means may include means responsive to the other of the series of actual speed and reference signals for providing a second series of signals complementary to said other series, and means responsive to the said one of the series of actual speed and reference signals and to the second series of complementary signals for providing a second output when the said one and the said second complementary signals coincide.

A first output means is disclosed which is operable to pass only output signals which exceed a predetermined minimum time duration. The first output means may utilize stretch circuit means for increasing the time duration of the output signals to a magnitude sufficient to be within the actuating response range of a controller means utilized therewith. Alternatively, a second output means may be utilized which provides a first output state in response to receipt of the first output signal and a second output state in response to receipt of a second output signal.

Other objects, features and advantages will become apparent from the following description when taken in conjunction with the accompanying drawings, in which:

FIG. 3 is a graphical representation of wave forms present in the apparatus of FIG. 1 when an underspeed condition is being corrected;

FIG. 4 is a block diagram illustrating an alternative digital data processing unit for use with the apparatus of FIG. 1;

FIGS. 5a and 5b graphically illustrate wave forms present in the apparatus illustrated in FIG. 4 during underspeed and overspeed conditions, respectively;

FIG. 6 illustrates an alternative form of an output means illustrating the teachings of this invention; and FIG. 7 is a block diagram representation of the application of the teachings of this invention to the measurement of a variable other than engine speed control.

DESCRIPTION OF THE PREFERRED EMBODIMENTS

Figure 1:
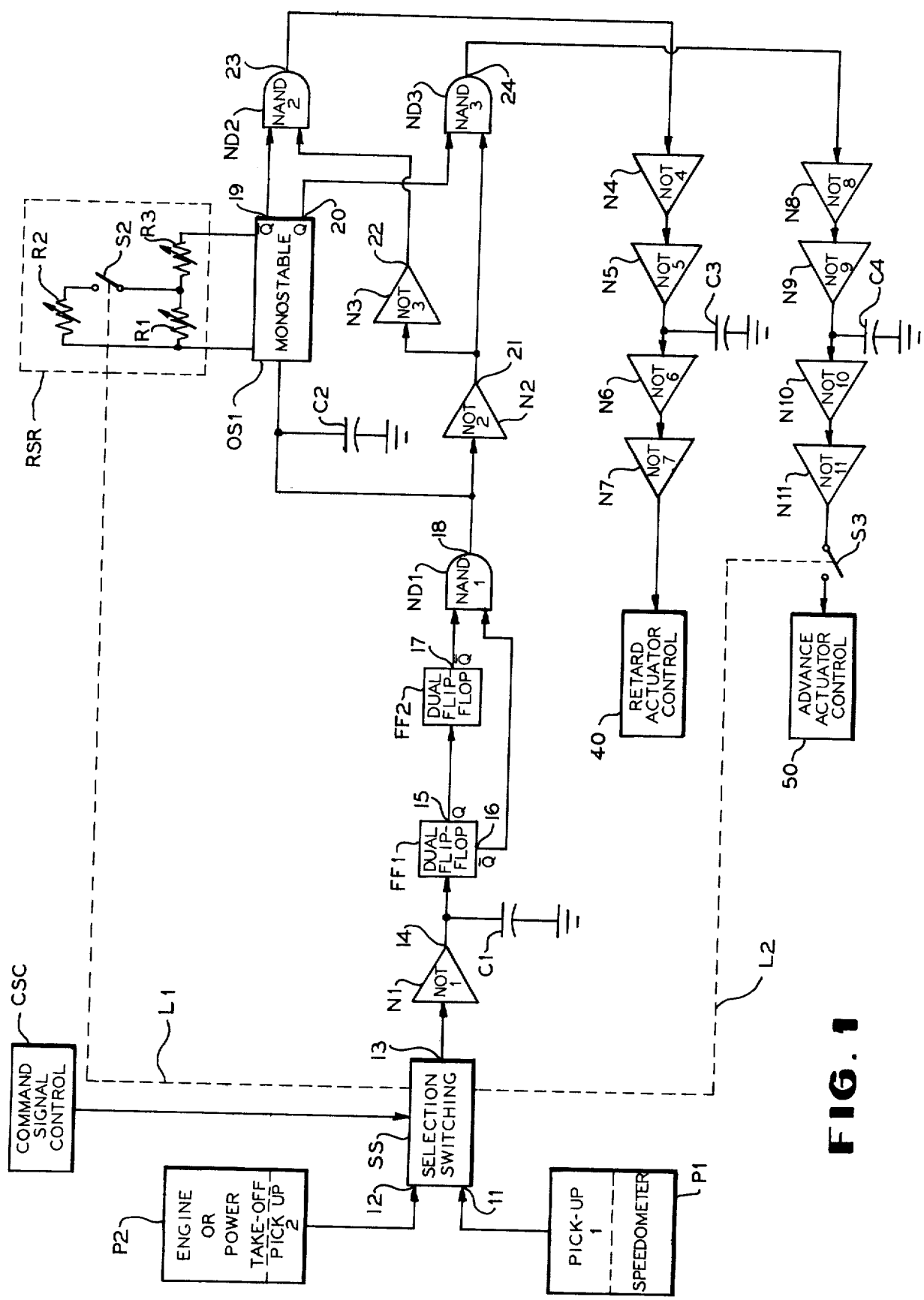
FIG. 1 is a block diagram illustrating a digital control system embodying the teachings of this invention.

Referring to FIG. 1 there is illustrated a first pickup P1 which may be utilized to sense road speed of a vehicle by any one of a number of well-known rotational speed sensors attached to, for example, the speedometer mechanism. A second pickup means P2 may be installed or located somewhere in the power train, e.g. on the shaft between the power take-off and the engine or anywhere there is a moving part which is indicative of engine speed. A sensing device which may be advantageously utilized for the pickups P1 and P2 is a Hall effect transducer which may have an internal integrated circuit, pulse-shaping network. This type of transducer may sense the magnitude of magnetic flux and at certain thresholds trigger on and off, forming a digital square wave. A switching means SS receives the inputs from the pickups P1 and P2 and, in response to a command signal control device CSC, selects one of the inputs for application to the control circuit via the output terminal 13. While not illustrated in detail the command signal control CSC may be a device which is responsive to the placing of the transmission of the vehicle into gear to select the input from the pickup P1, and responsive to the connection of the power take-off unit to the engine to select the input from the pickup P2.

The output from the selection switching device SS at terminal 13 is fed through a NOT logic circuit N1 to a dual flip flop circuit FF1 from terminal 14. The NOT logic circuit N1 is used primarily in this instance to assist in squaring up the digital signal received from either the pickup P1 or P2 and acts as a buffer for the pickup signal. Each of the components in FIG. 1 are responsive to changes in the leading edges of the input signals thereto. Thus, the frequency of the signals determines the response of the circuits. Therefore, if the pickup means is temperature sensitive, the responses to the leading edges render the circuit stable without respect to shifts in the pickup signal, since any time shift between successive pulses will be so negligible that operation of the system is not affected. Therefore, the system is not affected by temperature changes.

A signal conditioning circuit is provided to translate the positive pulse pickup signals received from the terminal 13 of the selection switching means SS to binary zero and binary one signals in which the time duration of a binary one signal is proportional to the actual speed of the device being monitored. The resultant binary one signals are spaced further apart by binary zero signals to permit better use of the binary one signals by the data processing section and the time duration of each binary one signal has an increased magnitude which enables more accurate calculation by the processing section.

The signal conditioning circuit includes the NOT logic circuit N1, a dual flip flop circuit FF1, a dual flip flop circuit FF2, and a NAND logic circuit ND1. The NOT logic circuit N2 may be considered as the output component for the signal conditioning circuit. The actual speed signal output means for the signal conditioning circuit is the NOT logic circuit N2 which provides a binary one signal having a time duration related in magnitude to the actual speed of the device being monitored. The signal conditioning circuit is also utilized to trigger the one-shot multivibrator OS1 to produce a reference value in the form of a binary one signal having a time duration related in magnitude to the desired speed of the device being monitored.

Figure 2:
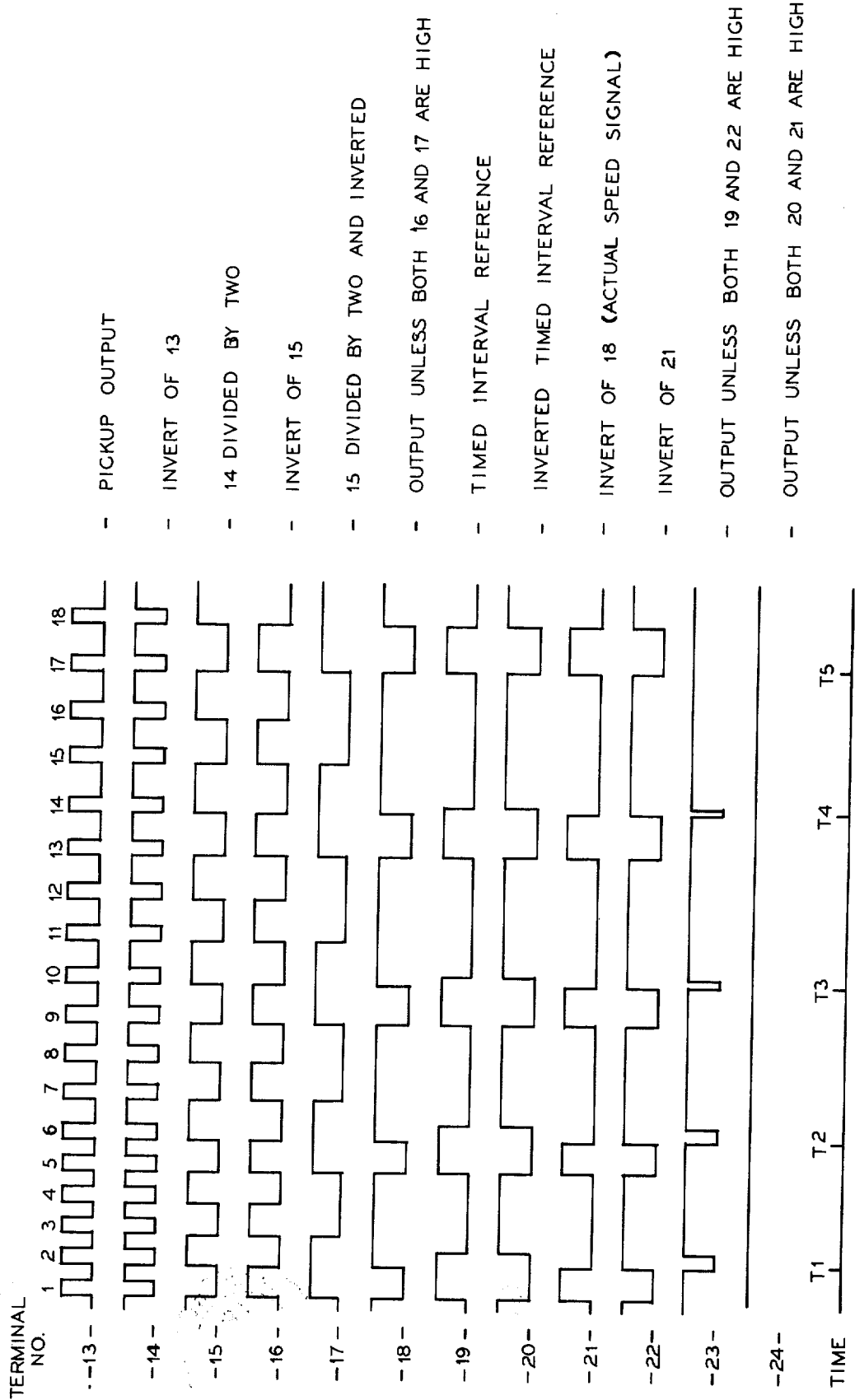
FIG. 2 is a graphical representation of wave forms present in the apparatus of FIG. 1 when an overspeed condition is being corrected.

Referring now to FIG. 2 there is illustrated graphical representations of the wave forms at various portions of the circuit of FIG. 1, each wave form being identified by the terminal with which it is associated. The graphical wave form representations in FIGS. 2 and 3 are not intended to be in scale either with respect to frequency or pulse width magnitude or time duration of the signals, but are intended to illustrate the operations performed upon the signals by the logic circuit components of the control apparatus.

As can be seen in FIG. 2 the positive pulse output at terminal 13 from one of the pickup devices P1 and P2 is received by the NOT logic circuit N1 and inverted. The circuit N1 squares up the shape of the pulse form and acts as a buffer for the signal conditioning circuit. A capacitance C1 is provided intermediate the NOT logic circuit N1 and the dual flip flop FF1 to lower the sensitivity of the dual flip flop FF1 and to reduce reaction to transients. The dual flip flop circuit FF1 includes two flip flops connected in series so that two excursions of the actuating leading edges of the pulses from the NOT logic circuit N1 are required to initiate a change in the output state at the terminals 15 and 16 of the dual flip flop FF1. This is illustrated by the wave forms shown for terminals 15 and 16 in FIG. 2.

It will be noted that the terminals of some of the devices in FIG. 1 are labeled with Q or $\overline{Q}$ outputs to designate the character of the wave form from those terminals. The Q output denotes that the leading edge of the output wave form from that terminal will have the same wave form as the leading edge of the actuating input signal to that component, e.g. the leading edge of the output pulse from terminal 15 is negative going in the same manner as the leading edge of the input actuating wave form from terminal 14. The $\overline{Q}$ output denotes that the leading edge of the output wave form from that terminal is complementary in form, e.g. the leading edge of the output wave form from terminal 16 is positive going when the leading edge of the actuating wave form input from terminal 14 is negative going.

The dual flip flop FF2 receives the output from dual flip flop FF1 and again divides the frequency of the pulse by two, it being noted that the output at terminal 17 is a $\overline{Q}$ output and thus is inverted with respect to the input thereof from terminal 15.

The outputs from the terminal 17 of the dual flip flop FF2 and from terminal 16 of the dual flip flop FF1 are applied to the NAND logic circuit ND1. The NAND logic circuit ND1 provides a high output unless both of the inputs from terminals 16 and 17 are high. Referring again to FIG. 2, it can be seen that a negative-going pulse form results at terminal 18 in which the binary zero portion of that negative pulse has a time duration which is related in magnitude to the actual speed of the device being monitored. The NOT logic circuit N2 inverts the wave form received from terminal 18 and provides a binary one output signal which again has a time duration related in magnitude to the actual speed of the device being monitored, although the time duration is much longer, and which is spaced from preceding and succeeding binary one signals a much greater distance than the spacing between the original input pulses at terminal 13. This enables the use of a reference signal time duration which is larger, therefore aiding calculations in the computation section of the processing unit and enabling more accurate output signals. In addition, the greater spacing between the signals prevents a condition where a reference signal might have a time duration which causes it to overlap successive actual speed signals, which would cause the multivibrator to be continually triggered before it completed its one-shot and prevent computation.

The signal conditioning circuit means functions to divide the number of input signals by a predetermined number and increases the time duration of the remaining input signals by a factor related to the predetermined number. This is accomplished utilizing a frequency dividing circuit and then blanking out every other one of the remaining frequency divided input signals thereby providing a series of actual condition signals wherein each of the signals has a time duration related in magnitude to the actual condition of the variable with each actual condition signal being spaced in time sufficiently to prevent overlap of a reference signal between actual condition signals.

The negative-going leading edge of the output at terminal 18 also triggers the monostable multivibrator OS1 to cause a binary one signal to appear at terminal 19 which has a time duration related in magnitude to the desired speed for the device being monitored. The time duration of the binary one signal at terminal 19 is determined by the values of impedances, both resistive and capacitive and combinations thereof, affecting the operation of the one-shot multivibrator OS1. In order to vary the value of the impedances, resistances R1, R2, and R3 are made adjustable so that the setpoint speeds may be adjusted and the adjustments reflected in the time duration of the binary one reference output from the terminal 19.

In actual practice, it is desirable to isolate the adjustable resistors R1 and R2 from the operator, so that the operator cannot modify the setpoint speeds which are required for best or safest operation for the device being monitored. The resistance R3 may be made available externally of the apparatus so that either setpoint speed may be adjusted downwardly by the operator, if he is engaged in an operation which requires gentle handling of the equipment being driven by the device being monitored. The resistance R1 in this instance is utilized to vary the output of the monostable multivibrator OS1 to provide a binary one output having a time duration which is related in magnitude to the desired road speed device for the vehicle. When the command signal control CSC actuates the selection switching means SS to select the speedometer pickup P1, the electrical or mechanical link L1 causes the switching means S2 to open while the electrical or mechanical link L2 causes the switch S3 to open. Thus, only the resistance R1, in conjunction with the resistance R3, can affect the time duration of the binary one output from terminal 19. Further, the advance actuator control 50 is inhibited or disabled from operation so that only the upper limit or maximum road speed is controlled, but any road speed below that can be selected by the operator through use of the accelerator.

When the command signal control CSC causes the selection switching means SS to select the engine or power take-off pickup P2, the links L1 and L2 close the switches S2 and S3. The resistance R2 is now placed in parallel with the resistance R1 so that the time duration of the binary one output from terminal 19 is now related in magnitude to a desired speed for the accessory device being monitored. Moreover, the advance actuator control 50 is now connected to cooperate with the retard actuator control 40 to bring the accessory speed to and maintain the speed of the accessory device being monitored at the desired speed level.

There has thus been described so far a sensing means which generates a series of input signals, each signal having a time duration inversely proportional to and the series having a frequency directly proportional to the actual speed of the device being monitored. A signal conditioning circuit has been described which includes a frequency divider means for reducing the number of input signals and means for periodically blanking out the frequency divided signals to increase the time spacing between input signals to prevent time overlaps by a reference signal.

The circuit as described thus far now produces a binary one signal at terminal 21 which has a time duration inversely proportional to the actual speed of the device being monitored and further produces a binary one signal at terminal 19 which serves as a reference and has a time duration which is related in magnitude to the desired speed for the device being monitored.

It is now necessary to calculate the difference between the time durations of the binary one reference signal and the binary one actual speed signal. To accomplish these calculations a novel computation circuit has been devised in which the complement of the binary one reference signal is compared to the actual speed binary one signal, while the complement of the binary one actual speed signal is compared to the binary one timed reference signal. The complement of the reference signal is obtained from terminal 20 of the one-shot multivibrator OS1. The complement of the actual speed signals is provided by the NOT circuit N3 at terminal 22, the NOT circuit N3 being responsive to the output of the NOT logic circuit N2.

The NAND circuit ND2 makes a comparison between the binary one reference signal from terminal 19 and the complement of the binary one actual speed signal from terminal 22. As noted hereinbefore a NAND logic circuit provides an output unless both of the inputs are high. FIG. 2 illustrates at time T1 the example of an actual speed signal having a time duration less than that of the reference signal, indicating an overspeed condition. As noted in FIG. 2 the NAND logic circuit ND2 compares the wave forms from terminals 19 and 22 and provides a negative going output at terminal 23 which has a binary zero portion with a time duration related in magnitude to the amount that the actual speed of the device being monitored exceeds the desired speed. At the same time T1 the NAND logic circuit ND3 is detecting the coincidence of any high values between the binary one actual speed signal from terminal 21 and the complementary reference signal from terminal 20. The combination of the wave forms at terminals 20 and 21 at time T1 do not have a coincidence of high levels and thus there is no output from the terminal 24 in the form of a negative going pulse.

The output from terminal 23 is fed through an output circuit to the retard actuator control 40 which reduces the speed of the device being monitored. As the reduction in speed is effected the time duration of the binary zero output from terminal 23 grows smaller, as noted at times T3 and T4, and when the speed is within the desired setpoint range, there is no output from either of the NAND circuits ND2 or ND3 at terminals 23 and 24, as noted at time T5.

An output circuit is provided for coupling the calculation section to the retard and advance actuator controls 40 and 50. The output circuits include NOT logic circuits N4, N5 and N6, and NOT logic circuits N8, N9 and N10, respectively. A capacitance C3, C4 is connected intermediate the last two NOT logic circuits N5, N6, and N9, N10, respectively, to perform two functions. First, the value of the capacitances C3 and C4 establishes a threshold value which requires that the output signals from the NAND logic circuits ND2 and ND3 have a predetermined minimum time duration magnitude before the output circuits will pass the output signals to the actuator controls. This provides a small dead band on each side of the setpoint speed so that hunting by the control system is avoided. When the capacitances C3, C4 become charged, then the output that is provided from the output circuits to the actuator control is stretched. That is, the time duration of the output signals to controls 40, 50 is longer so that actuator control devices may be utilized which have a slower response time, these devices being ordinarily less expensive and more readily available.

The NOT logic circuits N7 and N11, between the output circuits just described and the controls 40, 50, are shown to illustrate that either a negative-going signal having a binary zero value with a calculated time duration or a positive-going signal having a binary one value having a calculated time duration may be utilized, depending upon the type of actuator controls that are desired. In this instance a binary zero signal is being forwarded to the retard and advance actuator controls 40 and 50.

Referring now to FIG. 3, the wave forms are illustrated for the conditions when the actual speed signal has a time duration greater than the reference speed signal, indicating that the speed of the device is too slow and must be advanced. The signal conditioning circuit takes the leading edges of the wave forms received in terminal 13 and operates on them in the manner hereinbefore described to provide an actual speed signal from terminal 21 which is a binary one with a time duration related in magnitude to the actual speed of the device, and to trigger the one-shot multivibrator OS1 to provide the simultaneous formation of the binary one signal at terminal 19 which has a time duration related in magnitude to the desired set speed for the device.

In this instance the comparison of the reference speed signal from terminal 19 with the complementary actual speed signal from terminal 22 at time T1 in FIG. 3 does not provide a coincidence of binary one values and thus there is no output from the terminal 23. That is, the output from terminal 23 remains high and has no negative-going excursion. Therefore there are no negative-going binary zero signals to be operated on by the stretching circuit and forwarded to the retard actuator control 40. However, there is a coincidence of binary one levels between the actual speed signal from terminal 21 and the complementary reference signal from terminal 20 at time T1. Therefore, a negative-going pulse output appears at terminal 24 having a binary zero time duration which is related in magnitude to the amount that the speed of the device being monitored is below the desired reference speed. As correction occurs, the time differential of the binary zero output signal decreases, as noted at time T2 and time T3, until the actual speed binary one signal and the reference speed binary one signal are equal and no outputs appear from either of the terminals 23 or 24 at time T4.

Referring now to FIG. 4 there is illustrated a combination of logic elements which provides a positive-going, rather than a negative-going output signal to actuate the retard control 40 and the advance control 50. In FIG. 4 the binary one reference signal from terminal 19 is compared for coincidence with a complement of the actual speed signal from terminal 25 by an AND logic circuit AD1. Similarly, the actual speed binary one signal from terminal 21 is compared with a complement of the reference signal derived from the NOT logic circuit N14 at terminal 27 by the AND logic circuit AD2. The AND logic circuits provide a high output when there is a coincidence of high inputs.

Referring now to FIG. 5a there is a graphical representation of the calculations by the processing circuit when the time duration of the actual speed signal is longer than that of the reference signal. The timed reference signal at terminal 19 is compared to the complement of the actual speed signal from terminal 25 by the AND logic circuit AD1, and since there is no coincidence of high inputs there is no retard output signal at terminal 26. However, when the actual speed signal from terminal 21 is compared to the complement of the reference signal at terminal 27 there is a coincidence of high inputs to the AND logic circuit AD2. An advance output signal in the form of a positive-going pulse having a time duration at the binary one level which is related in magnitude to the deviation of the actual speed from the desired set speed appears at terminal 27.

Similarly, in FIG. 5b there is graphically illustrated wave forms which show the operation of the circuit of FIG. 4 when the time duration of the actual speed signal is shorter than that of the reference signal. The reference signal from the terminal 19 is compared to the complement of the actual speed signal at terminal 25, and since there is a coincidence of binary high inputs a positive-going output pulse occurs at the terminal 26 having a binary one time duration related in magnitude to the deviation of the actual speed above the set speed. However, when the actual speed signal from terminal 21 is compared to the complement of the reference speed signal from terminal 27, there is no coincidence of high inputs to the AND logic circuit AD2. Therefore no output occurs at terminal 28 of the AND logic circuit AD2.

Referring now to FIG. 6 there is illustrated an output circuit, utilizing the calculation section illustrated in FIG. 4, in which continuous outputs are provided in response to overspeed and underspeed conditions. In the circuit of FIG. 6 an output from AND circuit AD1 at terminal 26, indicating that the speed of the device being monitored should be retarded, is connected to the latch terminal L1 of the latch circuit LC1 and also connected to the release terminal R2 of the latch circuit LC2. Similarly, an output from terminal 28 of the AND logic circuit AD2, which indicates that the speed of the device being monitored should be advanced, is connected to the latch terminal L2 of the latch circuit LC2 and to the release terminal R1 of the latch circuit LC1.

When a single output pulse appears from terminal 26, the latch circuit LC1 is latched into a continuous output mode, while the latch circuit LC2 is released from a continuous output mode. When a single output pulse appears from the terminal 28 of the AND logic circuit AD2 and applied to the release terminal R1 of the latch circuit LC1 the output from the latch circuit LC1 is discontinued. When the output from terminal 28 is applied to latch terminal L2 of the latch circuit LC2 continuous output occurs until the underspeed condition is corrected.

While continuous outputs of the type provided by the apparatus in FIG. 6 are not generally desirable for engine speed control directly, since they encourage continual hunting, they may advantageously be utilized to actuate alarm circuits and/or lamps indicating the overspeed or underspeed condition. An operator may determine visually the mode the circuit is operating in. Time delayed alarm devices may also be actuated in the event that the operation being carried out will deteriorate or equipment damaged if the overspeed or underspeed condition is protracted.

Referring now to FIG. 7 there is illustrated in block diagram form the use of the calculation circuitry and control circuitry illustrated hereinbefore in FIGS. 1 and 4 to control other variables beside speed. A flow sensor FS detects the rate of fluid flow through a conduit CD and provides signals similar to those illustrated in FIG. 2 and FIG. 3 to a data processing unit DPU such as illustrated in FIGS. 1 and 4. The output from the data processing unit DPU is directed to a flow control FC in which the rate of flow is increased or decreased according to the directions received. Many other variables may be controlled by the system described herein but are not illustrated here since such applications are well known to those skilled in the art.

There has thus been described digital speed sensing apparatus which includes means for sensing the speed of a device and providing a first series of actual speed signals in which each signal has a time duration related in magnitude to the actual speed of the device, and for providing a second series of signals which are complementary to the first series signals. Means responsive to the sensing means also provide a third series of reference signals in which each of the third series signals is initiated simultaneously with the initiation of first series signal and has a time duration related in magnitude to a desired speed for the device, and for also providing a fourth series of signals which are complementary to the third series of signals.

A first logic means is responsive to a coincidence of the first and fourth series of signals for providing a fifth series of signals in which each fifth series signal has a time duration related in magnitude to a deviation in speed in a first direction from a desired speed. A second logic circuit means is responsive to a coincidence of a second and third series of signals for providing a sixth series of signals in which each sixth series signal has a time duration related in magnitude to a deviation in speed in a second direction from a desired speed.

Output means are provided which are operable only to pass fifth and sixth series signals which exceed a predetermined minimum time duration. The output means further advantageously includes stretch circuit means therein for increasing the time duration of the passed fifth and sixth series signals to a magnitude sufficient to be within the actuating response range of controller means connected thereto.

While there have been shown and described and pointed out the fundamental novel features of this invention with reference to the preferred embodiments thereof, those skilled in the art will recognize that various changes, substitutions, omissions and modifications in the components described may be made by those skilled in the art without departing from the spirit of the invention.

I claim:

1. Digital condition sensing and control apparatus comprising
   a. means for sensing the condition of a variable and providing an actual condition signal in which said signal has a time duration related in magnitude to the actual condition of the variable,
   b. means responsive to said sensing means for generating a reference signal which is initiated at the same time as said actual condition signal, said reference signal having a time duration related in magnitude to a desired condition for said variable,
   c. first logic circuit means including means for providing a complementary signal of said reference signal and for further providing a first output signal in response to a coincidence of said actual condition signal and said reference complementary signal to indicate a deviation of said variable in a first direction from said desired condition for said variable, said first output signal having a time duration related in magnitude to the difference between the actual condition and the desired condition, and
   d. second logic circuit means including means for providing a complementary signal of said actual condition signal and for further providing a second output signal in response to a coincidence of said reference signal and said complementary actual condition signal to indicate a deviation of said variable in a second direction from said desired condition for said variable, said second output signal having a time duration related in magnitude to the difference between the actual condition and the desired condition.

2. Apparatus as defined in claim 1
   a. in which said sensing means provides a continuous series of said actual condition signals and said reference signal generating means provides a continuous series of said reference signals,
   b. in which said first and second logic circuit means provides a first series and a second series of first output signals and second output signals in response to deviations from said desired condition in first and second directions, and
   c. which further includes first and second output means responsive to said first and second series of said output signals, respectively, each of said output means including stretching circuit means operable to pass output signals only in response to output signals exceeding a predetermined magnitude of time duration thereby providing a dead band on each side of said desired condition to prevent hunting.

3. Digital speed sensing apparatus comprising
   a. means for sensing the speed of a device and providing a series of actual speed signals in which each signal has a time duration related in magnitude to the actual speed of said device,
   b. means responsive to said sensing means for providing a like series of reference signals in which each of said reference signals is initiated at the same time as each of said actual speed signals and in which each of said reference signals has a time duration related in magnitude to a desired speed for said device,
   c. first logic circuit means responsive to the presence of an actual speed signal having a longer time duration than a concurrently occurring reference speed signal for providing a first output signal having a time duration related in magnitude to the amount the actual speed exceeds the desired speed, and
   d. second logic circuit means responsive to the presence of an actual speed signal having a shorter time duration than a concurrently occurring reference speed signal for providing a second output signal having a time duration related in magnitude to the amount the actual speed is lower than the desired speed.

4. Apparatus as defined in claim 3 which further includes output means operable to pass only output signals which exceed a predetermined minimum magnitude of time duration, thereby providing a dead band on each side of said desired speed to prevent a hunting operation by said speed sensing apparatus.

5. Apparatus as defined in claim 3 in which said sensing means includes
   a. means for generating a series of input signals having a frequency proportional to the actual speed of said device, and
   b. frequency divider means for reducing the number of input signals to increase the time spacing between input signals to prevent time overlaps of reference and input signals.

6. Digital control apparatus comprising
   a. means for sensing the condition of a variable and providing a series of digital actual condition signals in which each signal has a time duration related in magnitude to the actual condition of the device,
   b. means responsive to said sensing means for generating a like series of digital reference signals in which each reference signal is initiated at the same time as each of said actual condition signals, and in which each reference signal has a time duration related in magnitude to a desired condition for said variable,
   c. means responsive to one of said series of actual condition and reference signals for providing a series of digital signals complementary to said one series, and
   d. logic circuit means responsive to the other of said series of actual condition and reference signals and to said series of complementary signals for providing a series of digital output signals each having a time duration related in magnitude to the difference between the actual and desired conditions for said variable when said other and said complementary series signals coincide.

7. Digital speed sensing apparatus comprising
   a. means for sensing the speed of a device and providing a first series of actual speed signals in which each signal has a time duration related in magnitude to the actual speed of said device, and for providing a second series of signals which are complementary to said first series signals;
   b. means responsive to said sensing means for providing a third series of reference signals in which each of said third series signals is initiated simultaneously with the intiation of a first series signal and has a time duration related in magnitude to a desired speed for said device, and for providing a fourth series of signals which are complementary to said third series of signals;
   c. first logic means responsive to a coincidence of said first and fourth series of signals for providing a fifth series of signals in which each fifth series signal has a time duration related in magnitude to a deviation in speed in a first direction from said desired speed; and
   d. second logic means responsive to a coincidence of said second and third series of signals for providing a sixth series of signals in which each sixth series signal has a time duration related in magnitude to a deviation in speed in a second direction from said desired speed.

8. Apparatus as defined in claim 7 in which said second and fourth complementary series providing means comprise NOT logic circuit means.

9. Apparatus as defined in claim 8 in which said first and second logic means comprise NAND logic circuit means providing overspeed and underspeed output signals, respectively.

10. Apparatus as defined in claim 8 in which said first and second logic means comprise AND logic circuit means providing underspeed and overspeed output signals, respectively.

11. Apparatus as defined in claim 7 in which said sensing means includes
    a. pickup means for generating said series of input signals, each having a frequency of occurrence related to the actual speed of said device, and
    b. frequency divider means responsive to said input signals for reducing the number of input signals to increase the time spacing between remaining input signals.

12. Apparatus as defined in claim 11 in which said frequency divider means includes first and second dual flip flop circuit means.

13. Apparatus as defined in claim 12 in which said periodic blanking means includes
    a. circuit means for providing an output which is complementary to the output of said first flip flop means, and
    b. logic circuit means responsive to a coincidence of an output from said second flip flop means and said complementary output from said first flip flop means.

14. Apparatus as defined in claim 7 which further includes output means operable to pass only fifth and sixth series signals which exceed a predetermined minimum time duration.

15. Apparatus as defined in claim 7 which further includes output means having stretch circuit means therein for increasing the time duration of said fifth and sixth series signals to a magnitude sufficient to be within the actuating response range of controller means responsive thereto.

16. Apparatus as defined in claim 7 which further includes
    a. first and second output means responsive to said fifth and sixth series of signals, respectively,
    b. each of said output means comprising a plurality of serially connected NOT logic circuits and capacitor loading means connected to the junctions of two said NOT logic circuits.

17. Apparatus as defined in claim 16 in which each output means comprises three NOT logic circuits and in which said capacitor loading means is connected between the second and third NOT logic circuits.

18. Speed control apparatus comprising
    a. first means for sensing the road speed of a vehicle,
    b. second means for sensing the speed of an accessory device driven by the engine of the vehicle,
    c. circuit means selectively responsive to said first and second sensing means for generating a series of actual speed signals, each signal having a time duration related in magnitude to actual road speed and accessory speed,
    d. means for generating a first series of reference signals, each first series reference signal having a time duration related in magnitude to a desired maximum road speed and being initiated simultaneously with the initiation of an actual speed signal, e. means for generating a second series of reference signals, each second series reference signal having a time duration related in magnitude to a desired set point accessory speed and being initiated simultaneously with the initiation of an actual speed signal, f. first logic circuit means responsive to the presence of an actual speed signal having a longer time duration than a concurrently occurring reference speed signal for providing a first output signal having a time duration related in magnitude to the deviation between actual and reference speeds, g. second logic circuit means responsive to the presence of an actual speed signal having a shorter time duration than a concurrently occurring reference signal for providing a second output signal having a time duration related in magnitude to the deviation between actual and reference speeds, and h. switching means for selectively connecting said first sensing means to said actual speed signal circuit means, and for inhibiting the second output signal from said second logic circuit means, and for further selectively connecting said second sensing means to said actual speed signal circuit means.

19. Apparatus as defined in claim 18 in which said first and second reference signal generating means comprises a. a one-shot multivibrator responsive to said actual speed signal generating means, b. first impedance means for controlling the time duration of said first reference signals, and c. second impedance means for controlling the time duration of said second reference signals, and in which d. said switching means further includes means for selectively connecting said first impedance means to said multivibrator when said first sensing means is connected to said actual speed circuit means, and for further selectively connecting said second impedance means to said multivibrator when said second sensing means is connected to said actual speed circuit means.

20. Apparatus as defined in claim 18 in which a. said first logic circuit means includes means responsive to one of said series of actual speed and reference signals for providing a first series of signals complementary to said one series, and means responsive to the other of said series of actual speed and reference signals and to said first series of complementary signals for providing an output signal when said other and said first complementary signals coincide, and b. said second logic circuit means includes means responsive to the other of said series of actual speed and reference signals for providing a second series of signals complementary to said other series, and means responsive to said one of said series of actual speed and reference signals and to said second series of complementary signals for providing an output when said one and said second complementary signals coincide.

21. Digital condition sensing and control apparatus comprising a. means for sensing the condition of a variable and generating a series of input signals in which each said input signal has a time duration related in magnitude to the actual condition of the variable, b. circuit means for dividing the number of said input signals by a predetermined number and increasing the time duration of the remaining input signals by a factor related to said predetermined number, c. means responsive to said sensing means for generating a series of reference signals, each of which is initiated at the same time as an associated remaining input signal, each said reference signal having a time duration related in magnitude to a desired condition for said variable, d. first logic circuit means including means for providing a complementary signal of said reference signal and for further providing a first output signal in response to a coincidence of a remaining input signal and a reference complementary signal to indicate a deviation of said variable in a first direction from said desired condition for said variable, and e. second logic circuit means including means for providing a complementary signal of a remaining input signal and for further providing a second output signal in response to a coincidence of a reference signal and said complementary remaining input signal to indicate a deviation of said variable in a second direction from said desired condition for said variable.

22. Apparatus as defined in claim 21 which further includes circuit means for periodically blanking out every other one of said remaining input signals thereby providing a series of actual condition signals having a time duration related in magnitude to the actual condition of said variable with each actual condition signal being spaced in time to prevent overlap of a reference signal between the occurrence of actual condition signals, each said reference signal being initiated at the same time as each said actual condition signal.

23. Digital condition sensing and control apparatus comprising a. means for sensing the condition of a variable and generating a series of actual condition signals in which each said signal has a time duration related in magnitude to the actual condition of the variable, b. means responsive to said sensing means for generating a series of reference signals, each of which is initiated at the same time as a like actual condition signal, each said reference signal having a time duration related in magnitude to a desired condition for said variable, and c. digital logic circuit means for comparing each of said coinciding reference and actual condition signals and for providing a series of output signals each having a time duration related in magnitude to the deviation of said variable from the desired condition for said variable.

* * * * *